US 6,577,818 B2

(12) United States Patent
Hirano

(10) Patent No.: US 6,577,818 B2
(45) Date of Patent: Jun. 10, 2003

(54) INFORMATION PROCESSING METHOD, INFORMATION PROCESSING SYSTEM, ELECTRONIC DEVICE, AND CARTRIDGE

(75) Inventor: Hirofumi Hirano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,929

(22) Filed: Sep. 5, 2001

(65) Prior Publication Data

US 2002/0031341 A1 Mar. 14, 2002

(30) Foreign Application Priority Data

Sep. 14, 2000 (JP) ........................................ 2000-280659

(51) Int. Cl.$^7$ ............................................... G03B 17/50
(52) U.S. Cl. ........................................ 396/30; 396/321
(58) Field of Search ............................... 396/6, 30, 321, 396/390

(56) References Cited

U.S. PATENT DOCUMENTS

| | | | | |
|---|---|---|---|---|
| 3,946,411 A | * | 3/1976 | Asano et al. ................... | 396/30 |
| 4,290,688 A | * | 9/1981 | Call ............................... | 355/1 |
| 4,374,195 A | * | 2/1983 | Hutchinson .................. | 430/499 |
| 4,736,215 A | * | 4/1988 | Hudspeth et al. ............ | 396/207 |
| 5,923,906 A | * | 7/1999 | Zander ........................... | 396/6 |
| 6,222,999 B1 | * | 4/2001 | Pagano et al. ............... | 396/208 |
| 6,240,258 B1 | * | 5/2001 | Yoshikawa ................... | 396/311 |
| 6,243,538 B1 | * | 6/2001 | Okuno ........................... | 396/321 |
| 6,275,656 B1 | * | 8/2001 | Cipolla et al. .................. | 396/6 |
| 6,298,197 B1 | * | 10/2001 | Wain et al. ..................... | 396/2 |
| 6,324,345 B1 | * | 11/2001 | Enomoto ....................... | 396/311 |
| 6,345,151 B1 | * | 2/2002 | Hata .............................. | 396/6 |

FOREIGN PATENT DOCUMENTS

| | | |
|---|---|---|
| EP | 0 812 693 A1 | 12/1997 |
| EP | 1 000 752 A2 | 5/2000 |
| WO | WO 98/04414 | 2/1998 |

* cited by examiner

*Primary Examiner*—Russell Adams
*Assistant Examiner*—Michelle Nguyen
(74) *Attorney, Agent, or Firm*—Robin, Blecker & Daley

(57) ABSTRACT

There is provided an information processing method which can adjust benefits between electronic device makers and expendables makers. In the method of the present invention, a cartridge which is detachably attached to an electronic device is used. The cartridge carries expendables of the electronic device and has a storage medium in which information that specifies a maker of the electronic device is written by the electronic device when the expendable is consumed by the electronic device. The method comprises the recovery step of recovering the cartridge with the storage medium in which the information is written from a user, the acquisition step of acquiring the information written in the storage medium of the recovered cartridge; and the totalization step of totalizing quantities of expendables consumed for respective makers on the basis of the acquired information.

22 Claims, 11 Drawing Sheets

FIG. 5

| WORD | D9 | D8 | D7 | D6 | D5 | D4 | D3 | D2 | D1 | D0 |
|---|---|---|---|---|---|---|---|---|---|---|
| 1 | INK 1 : CAMERA BUSINESS DEPARTMENT OF COMPANY A |||||||||| 
| 2 | PAPER 1 : CAMERA BUSINESS DEPARTMENT OF COMPANY A ||||||||||
| 3 | PAPER 2 : CAMERA BUSINESS DEPARTMENT OF COMPANY A ||||||||||
| 4 | PAPER 3 : CAMERA BUSINESS DEPARTMENT OF COMPANY A ||||||||||
| 5 | PAPER 4 : CAMERA BUSINESS DEPARTMENT OF COMPANY A ||||||||||
| 6 | PAPER 5 : CAMERA BUSINESS DEPARTMENT OF COMPANY A ||||||||||
| 7 | INK 2 : MULTIMEDIA BUSINESS DEPARTMENT OF COMPANY B ||||||||||
| 8 | PAPER 6 : MULTIMEDIA BUSINESS DEPARTMENT OF COMPANY B ||||||||||
| 9 | ||||||||||
| ... | ||||||||||
| 25 | ||||||||||
| 26 | PAPER TYPE : A ||||||||||
| 27 | INK TYPE : B ||||||||||
| 28 | MANUFACTURER : COMPANY X ||||||||||
| 29 | MANUFACTURING DATE : JANUARY 20, 2000 ||||||||||
| 30 | MANUFACTURING LOT : AXZ00254 ||||||||||
| 31 | RECYCLE COUNT : 1 ||||||||||
| 32 | LAST USED DATE : AUGUST 20, 2000 ||||||||||
| 33 | ||||||||||
| ... | ||||||||||
| 63 | ||||||||||
| 64 | USER ID : 0125FVC ||||||||||

Words 1–25: BUSINESS ORGANIZATION INFORMATION FIELD
Words 26–41: PRODUCT INFORMATION FIELD
Word 64: USER INFORMATION FIELD

FIG. 10

| BUSINESS ORGANIZATION | FREQUENCY OF CONSUMPTION OF PRINT PAPER | FREQUENCY OF CONSUMPTION OF INK | RETURN AMOUNT |
|---|---|---|---|
| BUSINESS ORGANIZATION A | 12563000 | 837 | ¥1,256,719 |
| BUSINESS ORGANIZATION B | 1865300 | 1243 | ¥1,865,922 |
| BUSINESS ORGANIZATION C | 923100 | 615 | ¥923,408 |

INFORMATION PROCESSING METHOD, INFORMATION PROCESSING SYSTEM, ELECTRONIC DEVICE, AND CARTRIDGE

FIELD OF THE INVENTION

The present invention relates to information processing and, mainly, to information processing for adjusting benefits between a business organization which, e.g., manufactures electronic devices, and a business organization which, e.g., manufactures expendables for the electronic device.

BACKGROUND OF THE INVENTION

Along with the development of digital techniques, electronic devices such as a digital camera, printer, and the like have prevailed. As electronic devices have prevailed, demands for expendables used in those electronic devices (e.g., print paper, ink, and the like in case of a digital camera) increase.

A business organization which, e.g., manufactures electronic devices benefits by vending electronic devices, and a business organization which, e.g., manufactures expendables benefits by vending expendables.

On the other hand, the demand for expendables often depends on the value of an electronic device. As an electronic device is rated higher and is sold in larger quantities, the demand for expendables increases, and the benefit of the business organization which, e.g., manufactures expendables increases. Hence, the benefit of the business organization which, e.g., manufactures expendables is deeply related to an electronic device that uses the expendables.

However, a business organization which, e.g., manufactures electronic devices is not always the same as a business organization which, e.g., manufactures expendables. In this case, although a business organization which, e.g., manufactures electronic devices contributes to an increase in benefit of a business organization which, e.g., manufactures expendables since their electronic device is rated high, and the demand for expendables increases consequently, it has nearly no trade-off after the sales of the electronic device.

For this reason, a business organization which, e.g., manufactures electronic devices often limits expendables that can be used in their electronic device to those of a specific business organization. In this case, the types of expendables that can be used for each electronic device are limited, resulting in inconvenience for users. Also, a business organization which, e.g., manufactures expendables must deal with a specific business organization, thus disturbing expansion of their sales scale. On the other hand, since products that can use identical expendables do not prevail, the range of user's choice is narrow.

SUMMARY OF THE INVENTION

It is an object of the present invention to provide a method and system which can solve the aforementioned problems by adjusting the benefits between a business organization which, e.g., manufactures electronic devices, and a business organization which, e.g., manufactures expendables, an electronic device suitable for such method and system, and the like.

According to the present invention, there is provided an information processing method using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:

the recovery step of recovering the cartridge with the storage medium in which the information is written from a user;

the acquisition step of acquiring the information written in the storage medium of the recovered cartridge; and the totalization step of totalizing quantities of expendables consumed for respective business organizations on the basis of the acquired information.

According to the present invention, there is also provided an information processing system using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:

acquisition means for acquiring the information written in the storage medium of the recovered cartridge; and totalization means for totalizing quantities of expendables consumed for respective business organizations on the basis of the acquired information.

According to the present invention, there is also provided an information processing system using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:

an acquisition device for acquiring the information written from the cartridge with the storage medium in which the information is written; and a totalization device which is connected to the acquisition device to communicate with each other, receives the information acquired by the acquisition device, and totalizes quantities of expendables consumed for respective business organizations on the basis of the received information.

According to the present invention, there is also provided an information processing system using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:

a recovery device which is equipped to be used by everyone, and recovers the cartridge with the storage medium in which the information is written; and a totalization device connected to the recovery device to communicate with each other, the recovery device comprising acquisition means for acquiring the information from the cartridge, and the totalization device comprising:

totalization means for receiving the information acquired by the recovery device, and totalizing quantities of expendables consumed for respective business organizations on the basis of the received information.

According to the present invention, there is also provided an electronic device which comprises an electronic device main body, and a cartridge detachably attached to the electronic device main body, the cartridge comprising expendables consumed by the electronic device, and a storage medium for recording information, the electronic device main body comprising write means for writing information in the storage medium, and the write means writing at least information that specifies a business organization which provides the electronic device or a business organization associated with that business organization.

According to the present invention, there is also provided an electronic device to which a cartridge comprising expendables and a storage medium for storing information is detachably attached, comprising:

write means for writing information in the storage medium, and the write means writing at least information that specifies a business organization which provides the electronic device or a business organization associated with that business organization.

According to the present invention, there is also provided a cartridge detachable from an electronic device, comprising:

expendables of the electronic device, and a storage medium for storing information, and the storage medium being written with information that specifies a business organization for providing the electronic device which consumes the expendables or a business organization associated with that business organization.

In the present invention, the electronic device includes, e.g., a digital camera, printer, electronic cleaner, car navigation system with a ticket issuance function, and the like.

The expendables are, for example: print paper, films, inks, toners, and the like for a digital camera; print paper, inks, toners, and the like for a printer; a dust bag for an electronic cleaner; and ticket paper for a car navigation system with a ticket issuance function.

As a storage medium of the cartridge, e.g., a magnetic storage medium, semiconductor memory, and the like can be used.

The business organization which provides the electronic device includes, e.g., a company which manufactures electronic devices, a company which sells electronic devices, and the like. The business organization associated with the business organization includes, e.g., a parent company of a company which manufactures or sells electronic devices, affiliated companies, and the like. The business organization may be specified by, e.g., a business department in place of a company.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a memory map of a storage medium 21a;

FIG. 10 shows a totalization list as an example of the totalization result in a computer 201.

DETAILED DESCRIPTION OF THE PREFERRED EMBODIMENTS

Preferred embodiments of the present invention will now be described in detail in accordance with the accompanying drawings.

<Outline of System>

In general, the quantity in which expendables of a given type are consumed is associated with an electronic device with which expendables of that type are used, and is proportional to the prevalence of the electronic device that uses the expendable. However, a business organization which, e.g., manufactures electronic devices cannot benefit after it sells the electronic devices, and only a business organization which, e.g., manufactures expendables benefits, thus posing the aforementioned problems.

This embodiment provides a system in which a business organization which, e.g., manufactures expendables of a given electronic device can provide some benefit to a business organization which, e.g., manufactures that electronic device in correspondence with the quantity of expendables consumed. For this purpose, this embodiment collects information associated with business organizations and electronic devices which consume expendables, and totalizes such information.

Information is collected via a storage medium mounted on a cartridge that supplies a given type of expendables to an electronic device. When expendables of a given type are consumed by an electronic device, that electronic device writes information of, e.g., a manufacturer (to be referred to as business organization information hereinafter) in that storage medium. Therefore, used cartridges are recovered, and the storage contents of the storage media mounted on these cartridges are checked, thus collecting information associated with business organizations and electronic devices which consume expendables.

An information processing system according to this embodiment will be described in detail below. In this embodiment, a digital camera will be exemplified as the electronic device.

<Contents of Electronic Device>

Figure 1:
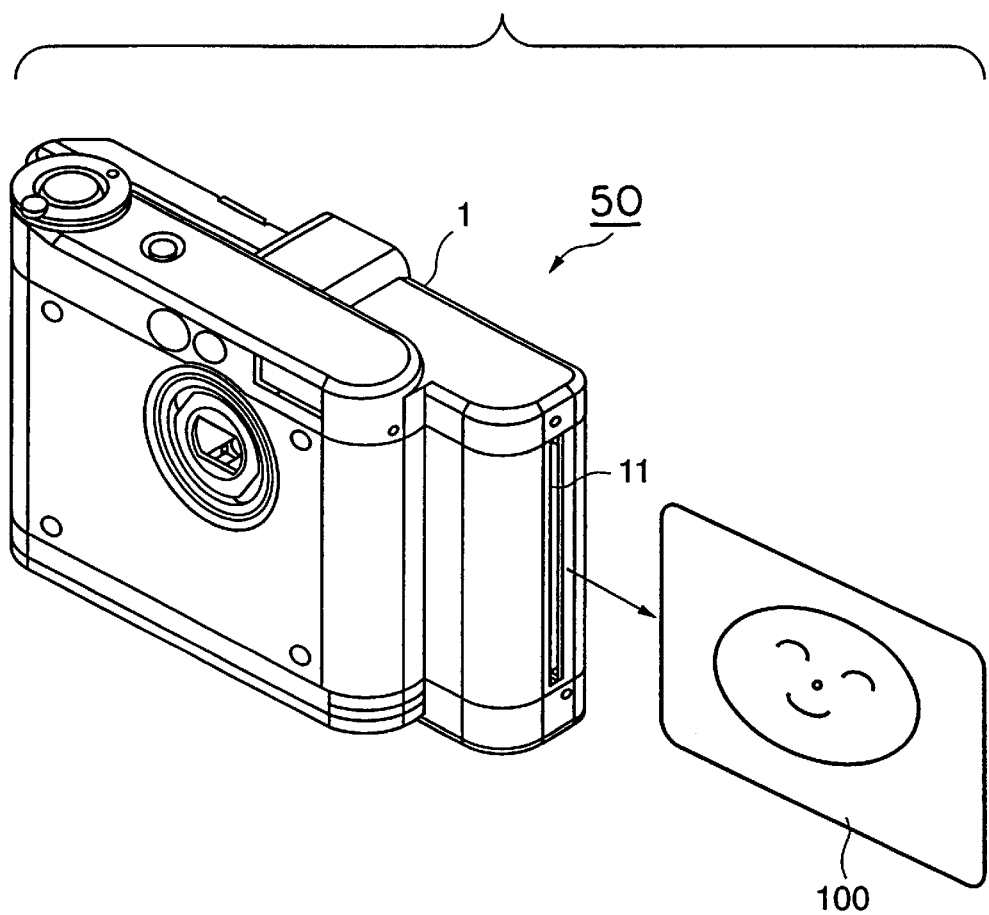
FIG. 1 is a schematic perspective view showing digital camera 50 according to an embodiment of the present invention.
Figure 2:
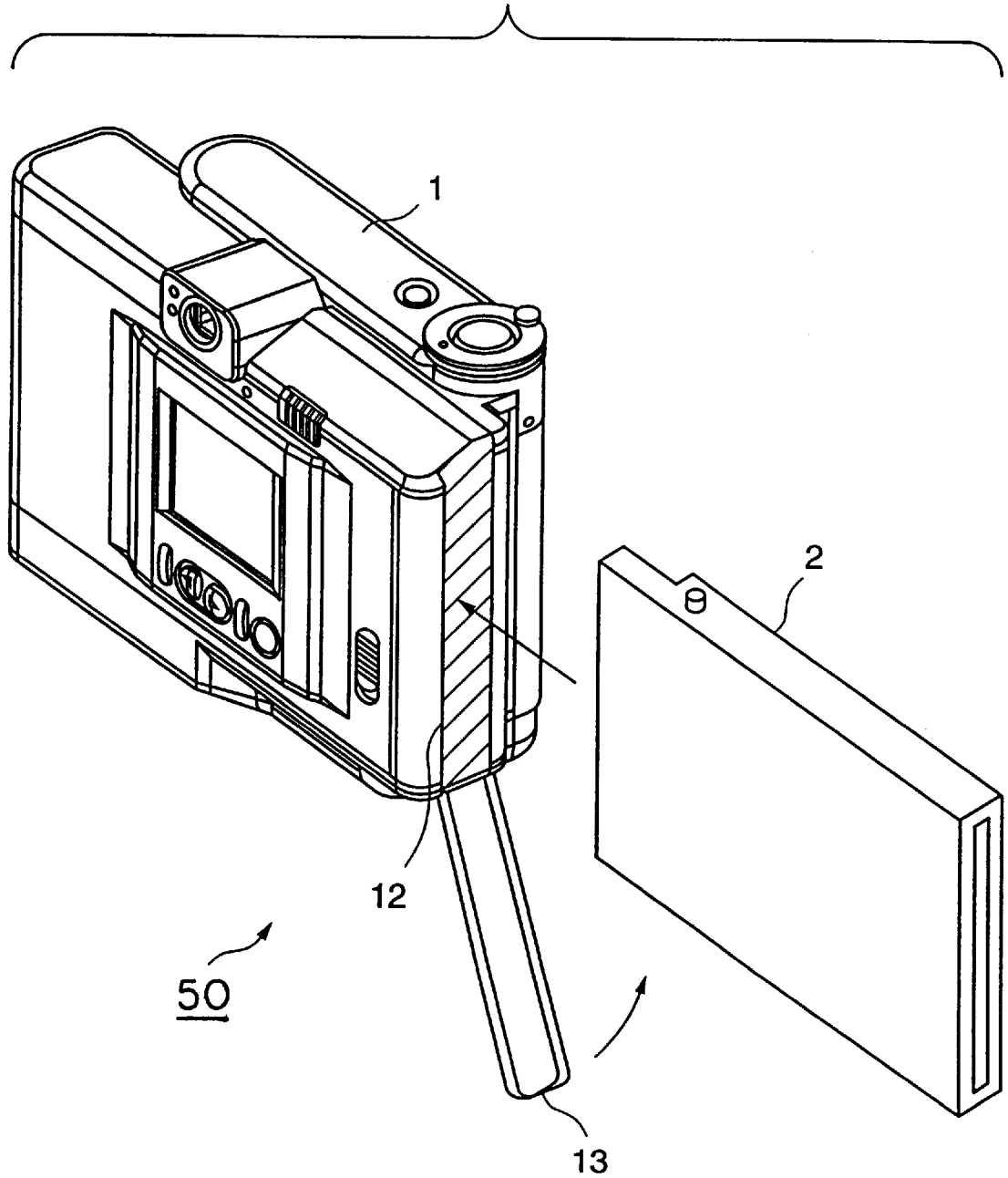
FIG. 2 is a schematic perspective view showing digital camera 50 according to an embodiment of the present invention.

FIGS. 1 and 2 are schematic views showing digital camera A according to an embodiment of the present invention.

Referring to FIGS. 1 and 2, digital camera 50 comprises a camera main body 1 and a cartridge 2 detachably attached to the camera main body 1. The camera main body 1 has a structure corresponding to the standards of the cartridge 2.

Digital camera 50 has an image print function of printing a sensed image on a print paper sheet in addition to a function of sensing an image, and generating and storing its digital data. As shown in FIG. 1, an exhaust port 11 is formed on the left side surface of the camera main body 1. A sensed image is printed on a print paper sheet inside the camera main body 1, and the printed print paper sheet (100) is exhausted from the exhaust port 11. Therefore, this digital camera 50 consumes print paper sheets and ink for an image print process as expendables.

The cartridge 2 carries print paper sheets and ink consumed by digital camera 50, is inserted into the camera main body 1 via a slot 12 open to the right side surface of the camera main body 1, and is stored inside the camera main body 1 by closing a cover 13 of the camera main body 1 after insertion. Note that the cartridge 2 may carry two different expendables as in this embodiment, or may carry one or three or more expendables.

Digital camera A has an image print function of printing a sensed image on a print paper sheet in addition to a function of sensing an image, and generating and storing its digital data. As shown in FIG. 1, an exhaust port 11 is formed on the left side surface of the camera main body 1. A sensed image is printed on a print paper sheet inside the camera main body 1, and the printed print paper sheet (100) is exhausted from the exhaust port 11. Therefore, this digital camera A consumes print paper sheets and ink for an image print process as expendables.

The cartridge 2 carries print paper sheets and ink consumed by digital camera A, is inserted into the camera main body 1 via a slot 12 open to the right side surface of the camera main body 1, and is stored inside the camera main body 1 by closing a cover 13 of the camera main body 1 after insertion. Note that the cartridge 2 may carry two different expendables as in this embodiment, or may carry one or three or more expendables.

Figure 3A:
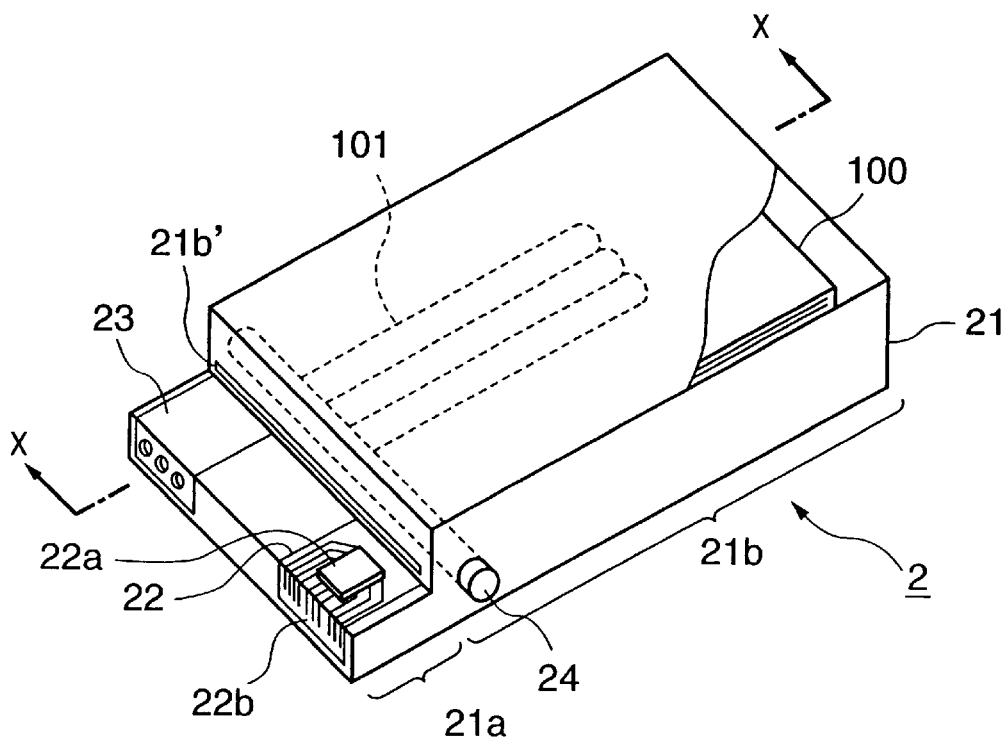
FIG. 3A is a detailed (partially cutaway) perspective view of a cartridge 2.
Figure 3B:
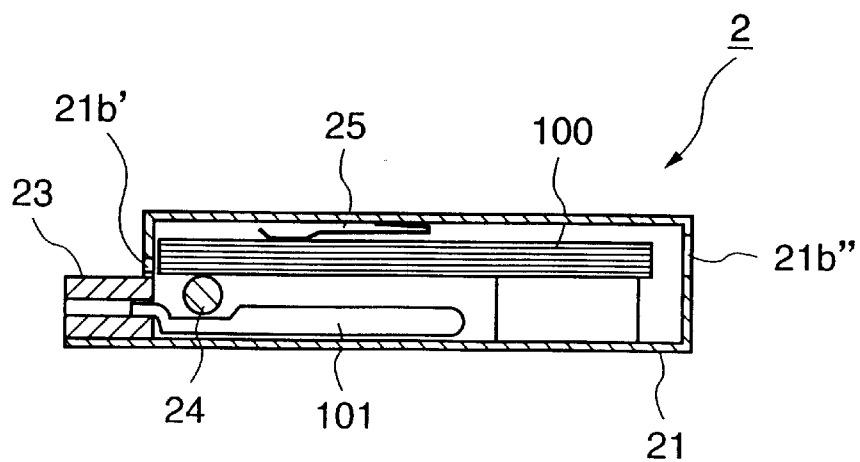
FIG. 3B is a sectional view taken along a line X—X in FIG. 3A.

FIG. 3A is a detailed (partially cutaway) perspective view of the cartridge 2, and FIG. 3B is a sectional view taken along a line X—X in FIG. 3A.

The cartridge 2 has a housing 21, a plurality of print paper sheets 100 and ink pack 101, which are housed and supported in the housing 21 and are consumed by digital camera 50, a circuit board 22 which mounts a storage medium 22$a$ for storing written information, and is attached to the housing 21, and a pickup roller 24 for exhausting The housed print sheet 100.

The housing 21 is formed of, e.g., plastic, and comprises a distal end portion 21$a$ to which the circuit board 22 and an ink delivery port 23 are attached, and a substantially hollow housing portion 21$b$ that houses the print paper sheets 100 and ink pack 101. The front end face of the housing portion 21$b$ is formed with a slit 21$b'$ via which the print paper sheet 100 is exhausted from the cartridge 2, and the rear end face of the housing portion 21$b$ is formed with a slit 21$b''$ via which print paper sheets 100 are refilled into the cartridge 2.

Ten odd to several ten print paper sheets 100 can be housed in the housing 21 when they are inserted via the slit 21$b''$, and can be repetitively refilled. The print paper sheets 100 are always biased toward the pickup roller 24 by a leaf spring 25, as shown in FIG. 3B.

The pickup roller 24 is an axial member which extends through the housing 21, and exhausts the print paper sheets 100 housed in the housing 21 one by one from the slit 21$b'$ when it is rotated externally. Upon printing an image, the camera main body 1 rotates this pickup roller 24 to pick up a print paper sheet 100 from the cartridge 2, and exhausts the print paper sheet 100 from the exhaust port 11 while printing an image thereon.

The ink pack 101 is formed of, e.g., a flat vinyl bag, and separately houses three, i.e., magenta, cyan, and yellow inks used to form a color image. As can be seen from FIG. 3B, the ink pack 101 is set under the print paper sheets 100, and is connected to the delivery port 23 having three holes for respective colors, thus delivering the color inks from the delivery port 23. The camera main body 1 can draw the color inks housed in the ink pack 101 by suction via the holes of the delivery port 23, and can use them upon printing an image. The ink pack 101 is also exchangeable together with the delivery port 23.

This embodiment assumes an EEPROM as the storage medium 22$a$, and a circuit pattern for accessing the storage medium 22$a$ is formed on the circuit board 22. In order to electrically connect the camera main body 1 and storage medium 22$a$, the distal end of the circuit pattern is exposed from the front end face of the cartridge 2 to form an electrode portion 22$b$. Upon loading the cartridge 2 into the camera main body 1, electrodes (not shown) provided inside the camera main body 1 contact this electrode portion 22$b$ to allow access from the camera main body 1 to the storage medium 22$a$. In this embodiment, the storage medium 22$a$ is arranged in the distal end portion 21$a$ of the housing 21, but is not limited to such specific location. For example, the storage medium 22$a$ may be arranged on, e.g., the upper surface of the housing portion 21$b$.

Figure 4:
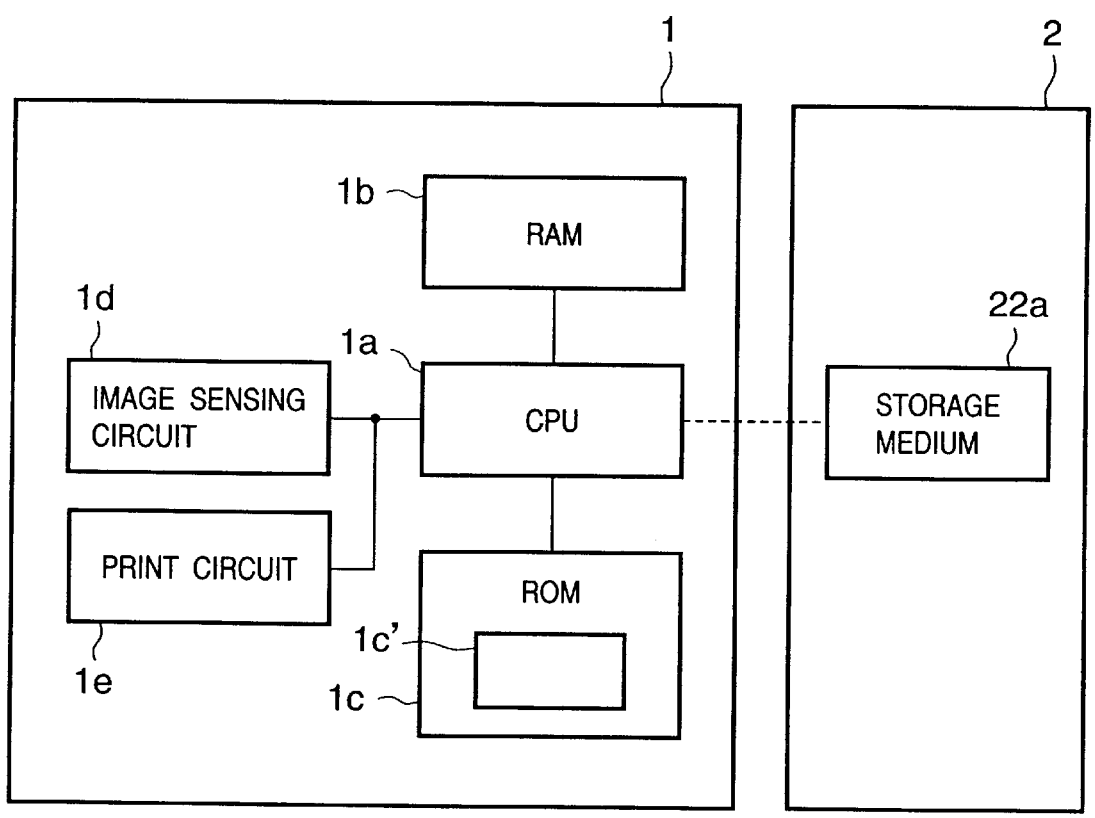
FIG. 4 is a block diagram showing principal electrical building components of a camera main body 1 and the cartridge 2.

FIG. 4 is a block diagram showing principal electrical building components of the camera main body 1 and cartridge 2. The camera main body 1 comprises an imaging circuit 1$d$ for imaging, a print circuit 1$e$ for printings an image on a print paper sheet 100, and the like in addition to a CPU 1$a$ for controlling the overall digital camera 50, a RAM 1$b$, and a ROM 1$c$ for storing programs and the like executed by the CPU 1$a$. When the cartridge 2 is loaded into the camera main body 1, the CPU 1$a$ can access the storage medium 22$a$ of the cartridge 2 via the aforementioned electrode portion 22$b$. Note that an area 1$c$ of The ROM 1$c$ stores business organization information that pertains to digital camera [A] 50. The business organization information may be an identification number (ID No) or the like as long as it can specify that business organization, and is set by, e.g., a manufacturer or the like upon manufacturing or delivering the camera main body 1. The identification number which defines the business organization Information can be individually assigned from a business organization which, e.g., manufactures expendables to a business organization which, e.g., manufactures electronic devices.

The storage contents of the storage medium 22$a$ will be described below. FIG. 5 shows the memory map of the storage medium 22$a$. In this embodiment, the storage area of the storage medium 22$a$ is predetermined in correspondence with the types of information.

Words 1 to 25 are business organization information fields in which business organization information stored in the ROM 1$c$ is written by the camera main body 1. Once information is stored, the business organization information fields are preferably inhibited from being erased to prevent tampering until all the storage contents of the storage medium 22$a$ are erased.

In this embodiment, business organization information is written and stored for each type of expendables and its unit quantity per Word. The reason why the business organization information is stored for each type of expendables is that expendables of different business organizations may be used in a single cartridge. In this embodiment, assume that the print paper sheets 100 and ink pack 101 are expendables dealt with by a single business organization.

Also, the reason why the business organization information is stored for each unit quantity is that a single cartridge may be used in digital cameras available from different business organizations. As the unit of expendables, for example, one sheet for the print paper sheets 100, a suction amount per process into the camera main body 1 for inks of the ink pack 101, and the like may be used.

In the example shown in FIG. 5, Words 1 to 5 store that the cartridge was used in an electronic device having business organization information "Camera Business Department of Company A", and Words 7 and 8 store that the cartridge was used in an electronic device having business organization information "Multimedia Business Department of Company B". In FIG. 5, "paper 1" and "paper 2" indicate the first and second paper sheets of the print paper sheets 100.

Note that business organization information may be stored for each type of expendables irrespective of its unit quantity, or only one information may be stored in each cartridge 2 irrespective of the unit quantity or the types of expendables. Alternatively, business organization information may be stored in association with the quantity of expendables of each type consumed.

Words 26 to 40 are product information fields, in which the specifications and the like of expendables included in the cartridge 2 are written and stored. Information stored in these fields is written by, e.g., a manufacturer of expendables upon, e.g., delivery of the cartridge 2.

In the example shown in FIG. 5, "paper type", "ink type", and the like are stored. When such specifications of expendables arc stored and are allowed to be referred to by digital camera 50, digital camera 50 can selectively execute an image process, print process, sad the like which best match the quality of each type of expandables.

The reason why a "recycle count" is written and stored is as follows. That is, the used cartridge 2 can be re-used by refilling the print paper sheets 100 and ink pack 101, as will be described later. However, when the recycle count increases, the cartridge 2 may deteriorate. Hence, the recycle count can be stored and checked. The reason why the "last used date" is written and stored is to check if expendables have deteriorated, when the cartridge 2 has not been used by the user for a long period of time and expendables may have deteriorated.

Word 64 is a user information field which stores information for specifying the user of digital camera A. The system of this embodiment provides some benefits to, e.g., a manufacturer of the electronic device in accordance with the quantity of expendables consumed. However, since the user consumes expendables in practice, it is preferable to provide some benefits to the user in accordance with the quantity of expendables consumed.

Hence, such information can be written and stored to totalize the quantity of expendables consumed for each user. The user registers an ID code acquired from the business organization of expendables in his or her digital camera A, which can write that code as user information in the storage medium 22a.

Other fields can be used by the business organization of digital camera 50, that of expandables, and the like as needed. Note that the cartridge 2 is manufactured by a business organization which, e.g., manufactures the camera main body 1 or that of expandables.

In digital camera 50 with the above arrangement, when the user instructs to print an image while the cartridge 2 is set in the camera main body 1, the CPU 1a of the camera main body 1 writes and stores business organization information in the business organization field of the storage medium 22a every time a print paper sheet 100 and inks of an pack 101 are consumed. The cartridge 2 is required upon printing an image, but need not be set upon sensing an image.

Figure 6:
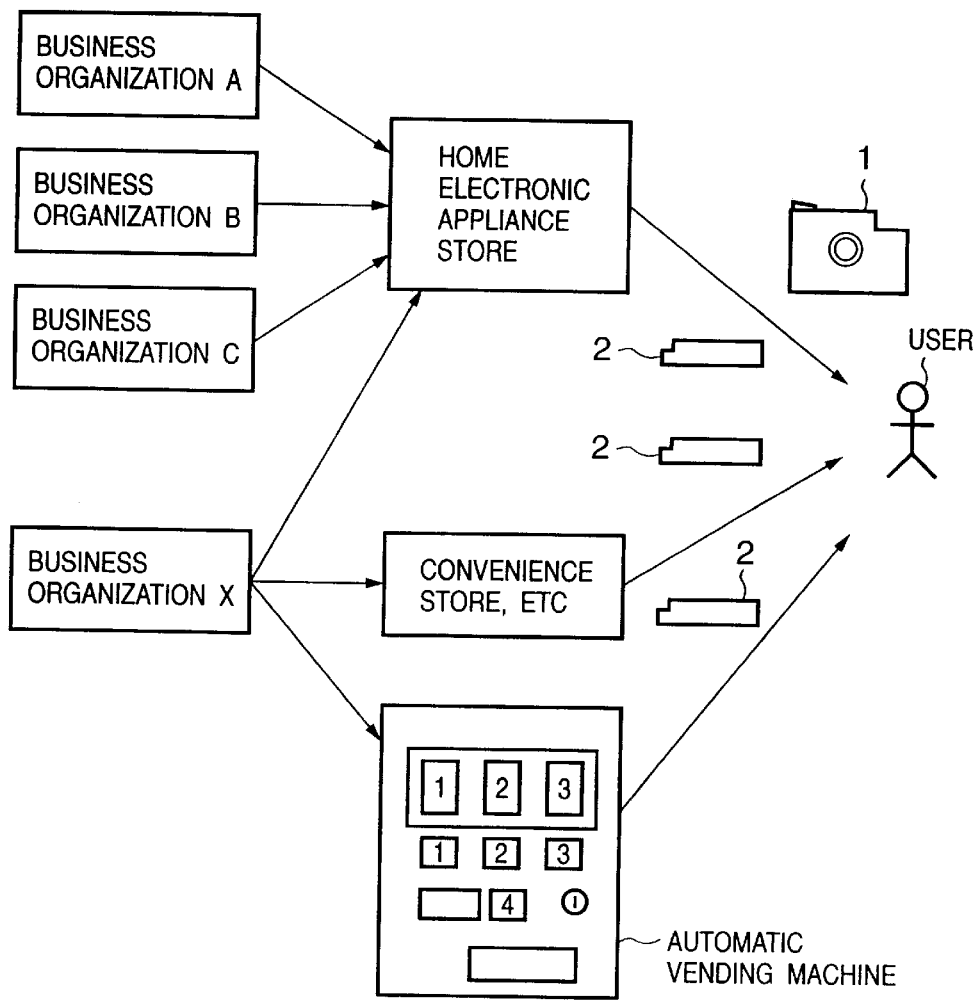
FIG. 6 shows a mode that the camera main body 1 and cartridge 2 are provided to the user.

FIG 6. shows various modes of providing the camera main body 1 and cartridge 2 to the user. This embodiment assumes business organization; A to C as business organizations which, e.g., manufacture digital camera 50 and the like, and business organization X as a business organization which, e.g., manufactures expendables such as print paper sheets 100 and the like. Therefore, an environment in which business organization X gives some benefits to business organizations A to C on the basis of the quantity of expendables consumed will be assumed.

The user may purchase the camera main body 1 alone or together with the cartridge 2 at, e.g., a home electronic appliance store. In FIG. 6, business organizations A to C manufacture camera main bodies 1. Business organizations A to C can independently manufacture various camera main bodies 1 compatible to the cartridge 2, and offer them to the market. The user can use various camera main bodies using the identical cartridge 2.

The user may purchase the cartridge 2 at normal stores such as a convenience store, kiosk, and the like in addition to home electronic appliance stores, and also at an automatic vending machine which is equipped at a shop street so that everyone can use it, and automatically vends a cartridge 2.

In FIG. 6, business organization X, e.g., manufactures print paper sheets 100 and ink pack 101 to be used in the cartridge 2. Business organization X can offer various types of print paper sheets 100 and ink packs 101 compatible to the cartridge 2 to the market, and these expendables can be used in all camera main bodies 1 of business organizations A to C, thus producing an increase in demand.

<Mode of Cartridge Recovery>

Figure 7:
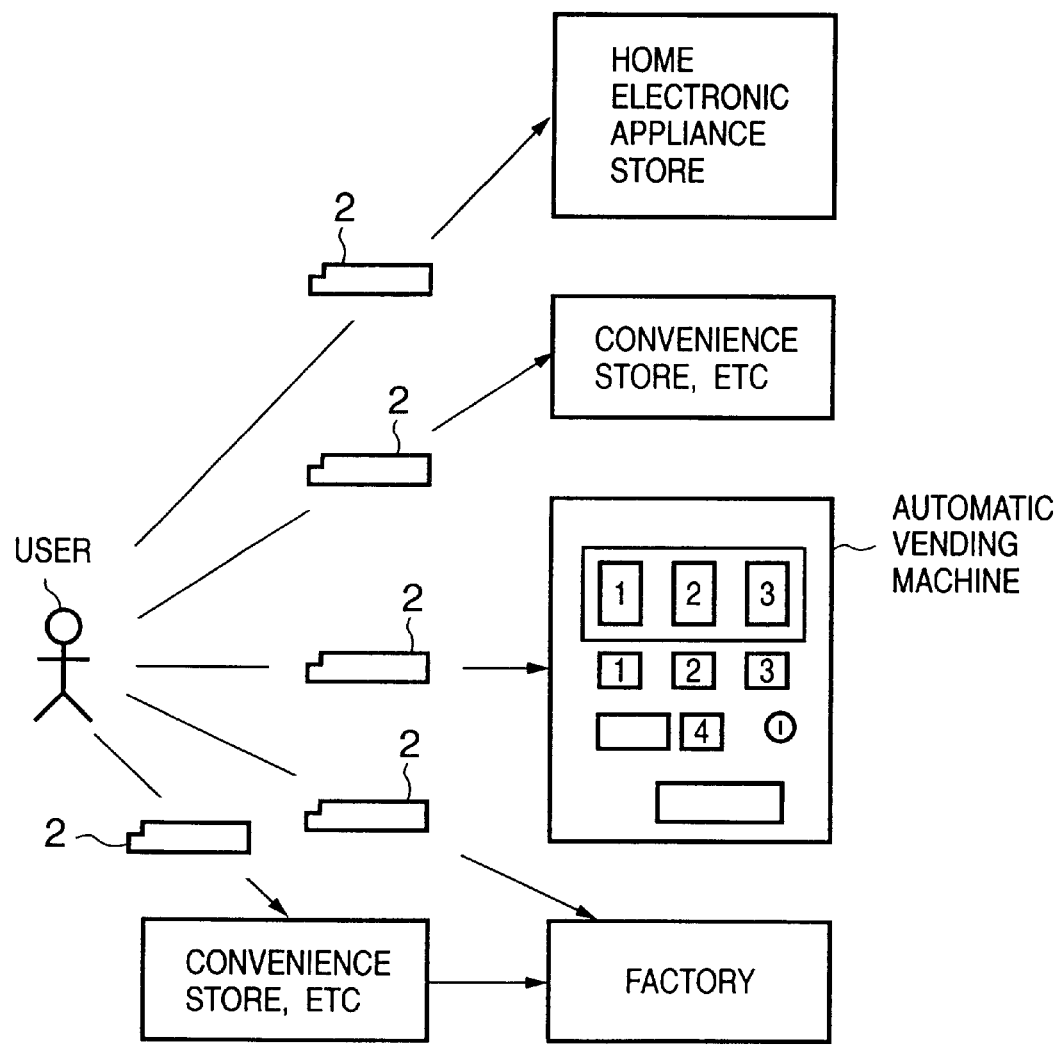
FIG. 7 shows various modes in which the cartridge 2 is recovered.

When the user uses digital camera 50, expandables in the cartridge 2 are consumed, and business organization information is written in the storage medium 22a of the cartridge 2. Business organization X of expenables recovers the used cartridge 2 to acquire business organization information. The cartridge 2 can be recovered directly by business organization X, and in various other modes. FIG. 7 shows various modes of recovery of the cartridge 2.

The user may bring the used cartridge 2 in stores such as a home electronic appliance shop, convenience store, and the like. Also, used cartridges 2 may be recovered by an automatic vending machine which is equipped at a railway station or shop street so that everyone can use, and also serves as a recovery device. Furthermore, the user may send the used cartridge to a factory of business organization X via a door-to-door parcel delivery service or mail. Moreover, used cartridges 2 brought in the convenience store or the like may be sent to the factory of business organization X by a shop clerk of that convenience store or the like.

To promote recovery of used cartridges 2, users who cooperate with recovery are preferably given some benefits (for example, discount upon purchasing expendables). Also, stores and the like which cooperate with recovery are preferably given some benefits (for example, incentive in accordance with the number of recovered cartridges per predetermined period).

The recovered used cartridges 2 may be recycled by refilling new expendables. New expendables may be refilled in the factory of business organization X, and also at the home electronic appliance store, convenience store, and the like. Such expendables may be manually refilled or a refilling device that automatically refills expendables may be equipped in a store.

In this case, in a store or the like, new expendables may be refilled immediately at the time of recovery, and may be provided to the user. As a result, since the user can purchase only new expendables, his or her expense can be lower than that when he or she purchases a new cartridge 2.

When the cartridge 2 is recycled, the contents of the storage medium 22a are erased after the business organization information is acquired.

<Collection/Totalization of Business Organization Information>

Collection and totalization of business organization information will be explained below. A case will be exemplified below wherein used cartridges 2 are recovered at a store such as a home electronic appliance store, convenience store, or the like, the automatic vending machine, or the factory of business organization X.

Figure 8:
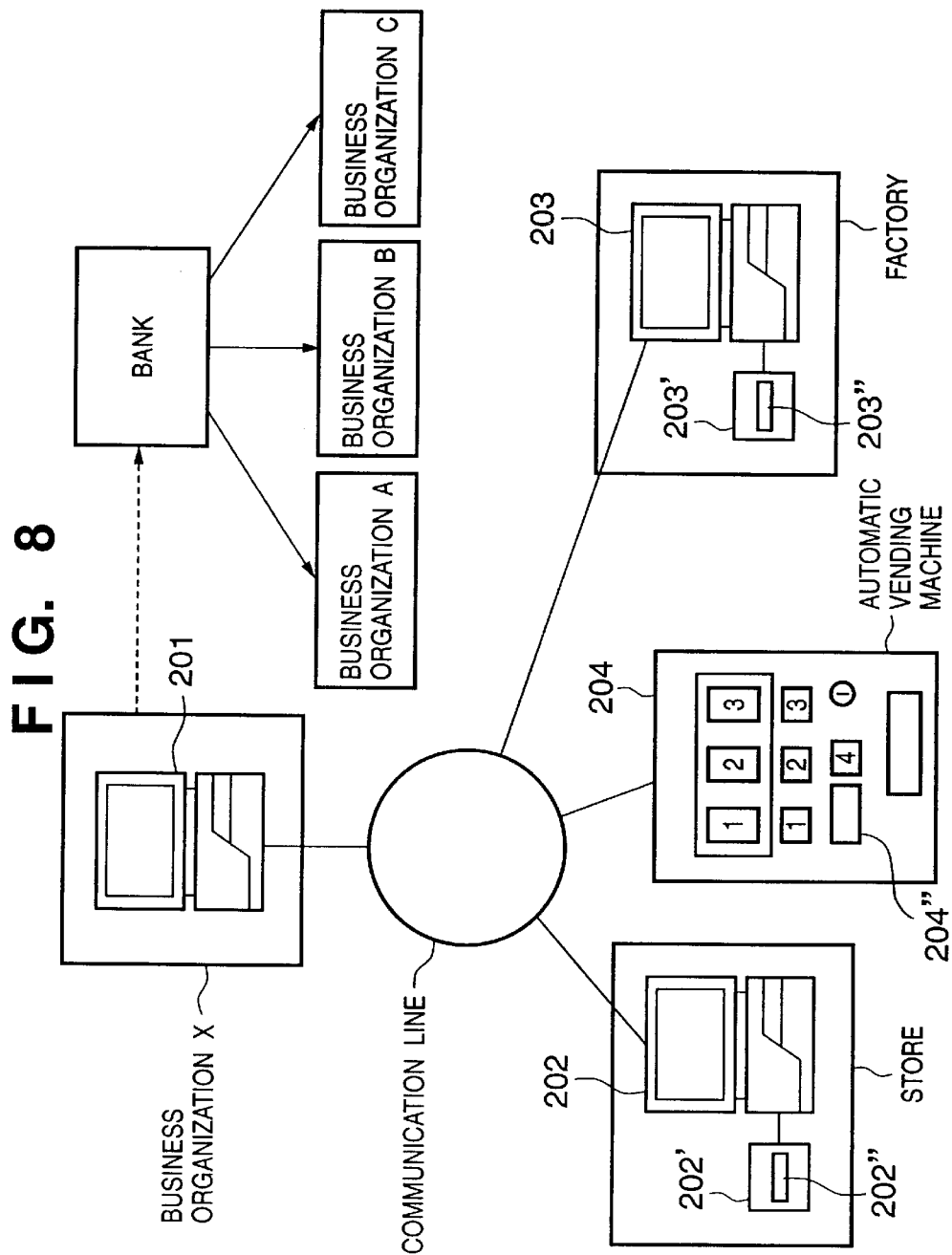
FIG. 8 is a schematic diagram of an information processing system for collecting and totalizing business organization information according to an embodiment of the present invention.

FIG. 8 is a schematic diagram of an information processing system for collecting and totalizing business organization information.

The information processing system comprises a computer 201 of business organization X, computers 202 and 203 connected to the computer 201 via a communication line to communicate with each other, and an automatic vending machine 204.

The computer 202 is equipped in a store such as a home electronic appliance store, convenience store, or the like, and the computer 203 is equipped in the factory of business organization X. That is, the computer 202 and the like are equipped at locations where used cartridges 2 are recovered.

To the computers 202 and 203, readers 202' and 203' for acquiring business organization information from the storage media 22a of used cartridges 2 are connected.

Figure 9:
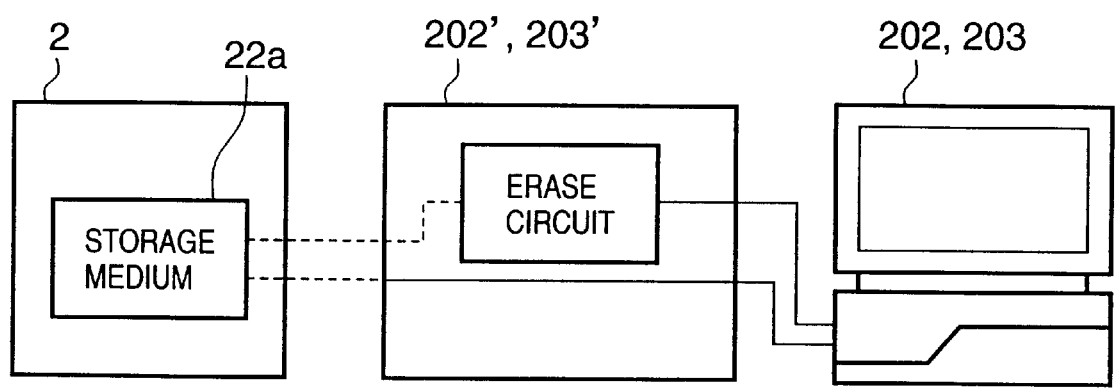
FIG. 9 is a block diagram showing principal electrical building components among the cartridge 2, a reader 202' or 203', and a computer 202 or 203.

The readers 202' and 203' respectively comprise slots 202" and 203" for receiving used cartridges 2. When the used cartridge 2 is inserted into this slot, the reader 202' or 203' is electrically connected to the storage medium 22a via the electrode portion 22b of the cartridge 2. FIG. 9 is a block diagram showing principal electrical building components between the reader 202' or 203' and the computer 202 or 203.

As a result, the computers 202 and 203 can access the storage media 22a of cartridges 2 via the readers 202' and 203', and can read and write information. The business organization information read by the computer 202 or 203 is sent to the computer 201 of business organization X via the communication line as needed, and business organization X can collect business organization information.

Note that each of the readers 202' and 203' comprises an erase circuit for erasing the storage contents of the storage medium 22a, and erases the business organization information and the like stored in the storage medium 22a in response to a command from the computer 202 or 203. By erasing the storage contents, the cartridge 2 can be recycled. Note that product information of new expendables refilled for the purpose of recycle is written by the computer 202 or 203.

In FIG. 8, the automatic vending machine 204 is equipped at a railway station or shop street, so that everyone can use, and has a function of automatically vending various cartridges 2 by inserting money. In addition, the automatic vending machine 204 recovers a used cartridge inserted via a slot 204', and also has a function of acquiring business organization information from the storage medium 22a and sending it to the computer 201 of business organization X as needed since it has the same arrangement as that of the computer 202 and reader 202' mentioned above. Note that the automatic vending machine 204 may be added with a function of refilling new expendables in the recovered used cartridge 2, and erasing and rewriting the storage contents of the storage medium 22a as needed upon inserting money, and may return a recycled cartridge 2 to the user.

In this way, the computer 201 of business organization X collects business organization information stored in the storage media 22a of recovered cartridges 2. However, the collection method of business organization information is not limited to this, and the business organization information may be collected orally or by documents (e.g., telephone, FAX, mail, and the like).

The computer 201 totalizes collected business organization information to calculate the quantities of expendables consumed for respective businesses. Totalization may be done everyday or periodically (e.g., several weeks or several months).

To provide some benefits to respective business organizations in correspondence with the quantities of expendables consumed, an amount in which each business organization is paid is determined.

FIG. 10 shows a totalization list as an example of the totalization result in the computer 201. According to the totalization list in FIG. 10, the frequencies of consumption of print paper sheets 100 (e.g., the numbers of print paper sheets 100 used) and the frequencies of consumption of inks in the ink packs 101 (e.g., the numbers of times of ink suction) are totalized in correspondence with business organizations A to C which, e.g., manufacture camera main bodies 1, and return amounts corresponding to these frequencies of consumption are calculated. Note that the return amount is calculated by (frequency of consumption of print paper sheets)×1 yen+(frequency of consumption of ink)×0.5 yen.

Business organization X pays business organizations A to C in the calculated return amounts via, e.g., a bank, as shown in FIG. 8.

In this way, according to the system of this embodiment, a business organization which, e.g., manufactures electronic devices can be given some benefits from a business organization which, e.g., manufactures expendables for the electronic devices in accordance with the quantities of the expendables consumed by the electronic devices even after they sell the electronic devices.

As a result, related products that can use identical expendables can prevail, and the number of choices of expendables each electronic device can use increases, thus providing great merits to users.

Since business organizations which, e.g., manufacture electronic devices are expected to standardize electronic devices and cartridges to obtain the aforementioned benefits from the business organization which, e.g., manufactures expendables, the application range of this system will be sufficiently broadened.

For a business organization which, e.g., manufactures expendables, disbenefits, i.e., return of some benefits obtained by, e.g., selling expendables to business organizations which, e.g., manufacture electronic devices, occur. However, since a business organization which, e.g., manufactures expendables can deal with many business organizations which, e.g., manufacture electronic devices in place of a specific business organization, an increase in benefit is finally expected since the sales scale is expanded.

Therefore, the system of this embodiment can contribute to activation of the industry of electronic devices and associated products.

<Another Embodiment>

In the above embodiment, one business organization X which, e.g., manufactures expendables collects and totalizes business organization information, and returns benefits. Alternatively, a plurality of business organizations which, e.g., manufacture expendables may execute these processes. In this case, a plurality of business organizations preferably execute such processes not independently but in collaboration to prevent confusion in the industry.

A case will be explained below wherein a plurality of business organizations which, e.g., manufacture expendables form an association or the like, and execute the aforementioned system.

Figure 11:
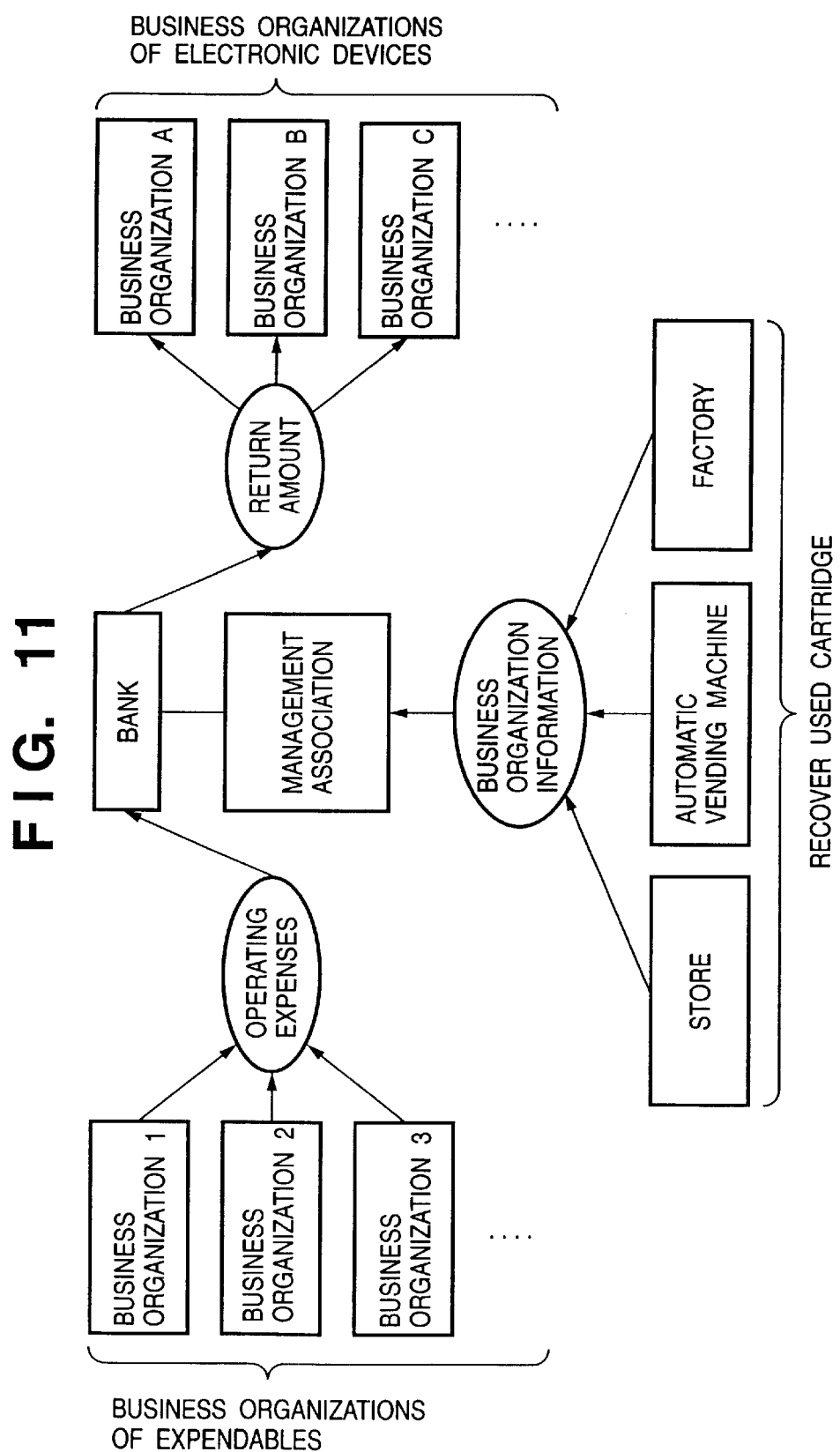
FIG. 11 is a schematic diagram of a system according to another embodiment of the present invention.

FIG. 11 is a schematic diagram of this system.

In the system shown in FIG. 11, there are a plurality of business organizations which, e.g., manufacture expendables such as print paper sheets 100 and the like (business organizations 1 to 3). For this reason, these business organizations 1 to 3 establish a management association.

Business organizations 1 to 3 of expendables and the like pay operating expenses of the management association. The operating expenses are pooled in a bank. The amount of operating expenses can be determined as needed. For example, the operating expenses may be proportional to the quantities of expendables that business organizations 1 to 3 and the like deliver (for example, 1 yen per print paper sheet).

In the system shown in FIG. 11, the management association collects and totalizes business organization information. Therefore, all pieces of business organization information acquired at stores, automatic vending machines, factories, and the like where used cartridges are recovered are sent to the management association.

The management association totalizes collected business organization information to calculate a return amount to be given back to business organizations A, B, C, and the like which, e.g., manufacture electronic devices. The business organizations A, B, C, and the like are paid in calculated return amounts from the operating expenses pooled in the bank.

The return amount is preferably calculated in correspondence with the quantities of expendables consumed in electronic devices of business organizations A, B, C, and the like. However, not all cartridges are always recovered. In this case, business organizations A, B, C, and the like cannot obtain the corresponding return amount even when expendables are actually consumed in their electronic devices.

For this reason, an amount proportional to the quantity of expendables business organizations 1 to 3 of expendables and the like deliver during a predetermined period is determined to be a total return amount independently of whether or not expendables are actually consumed, shares of the quantities of expendables consumed by electronic devices of business organizations A, B, C, and the like are calculated for each predetermined period, and each of business organizations A, B, C, and the like is paid in an amount corresponding to the share in the total return amount as a return amount.

For example, assume that the quantity of expendables business organizations 1 to 3 of expendables and the like deliver from January to March is 10 million, and the total of return amounts during that period is 10 million×1 yen=10 million yen. In consideration of the time lag between supply and demand of expendables, the consumption period of expendables delivered from January to March is estimated to range from April to June and business organization information during that period is totalized. As a result of totalization, if the shares of business organizations A to C from April to June are respectively 50%, 30%, and 10%, 5 million yen, 3 million yen, and 1 million yen are calculated as return amounts for business organizations A to C even when the total quantity of consumption is 5 million as the totalization result of business organization information.

As many apparently widely different embodiments of the present invention can be made without departing from the spirit and scope thereof, it is to be understood that the invention is not limited to the specific embodiments thereof except as defined in the claims.

What is claimed is:

1. An information processing method using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:

a recovery step of recovering the cartridge with the storage medium in which the information is written from a user;

an acquisition step of acquiring the information written in the storage medium of the recovered cartridge; and a totalization step of totalizing quantities of expendables consumed for respective business organizations on the basis of the acquired information.

2. The method according to claim 1, further comprising a step of determining an amount, in which each business organization is to be paid, on the basis of a totalization result obtained in the totalization step.

3. The method according to claim 1, further comprising a step of erasing the information that specifies the business organization, which is written in the storage medium of the recovered cartridge, and refilling the expenables.

4. The method according to claim 1, wherein the recovery step is executed in a predetermined store.

5. The method according to claim 1, wherein the recovery step and the acquisition step are executed by a recovery device equipped to be used by everyone, and the totalization step is executed by a computer which is connected to the recovery device to communicate with each other.

6. The method according to claim 5, wherein the recovery device erases the information that specifies the business organization, which is written in the storage medium of the recovered cartridge, and refills the expendables.

7. An information processing system using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:

acquisition means for acquiring the information written in the storage medium of the cartridge recovered from a user; and totalization means for totalizing quantities of expendables consumed for respective business organizations on the basis of the acquired information.

8. The system according to claim 7, wherein said totalization means determines an amount, in which each business organization is to be paid, on the basis of a result of said totalization means.

9. The system according to claim 7, further comprising:
means for erasing the information that specifies the business organization, which is written in the storage medium of the cartridge recovered from a user; and
means for refilling the expendables in the cartridge.

10. An information processing system using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:
an acquisition device for acquiring the information written from the cartridge with the storage medium in which the information is written; and
a totalization device which is connected to said acquisition device to communicate with each other, receives the information acquired by said acquisition device, and totalizes quantities of expendables consumed for respective business organizations on the basis of the received information.

11. The system according to claim 10, further comprising a plurality of acquisition devices equivalent to said acquisition device, and
wherein said acquisition devices are respectively equipped in predetermined stores.

12. The system according to claim 11, further comprising:
a device which is equipped in each store and erases information that specifies the business organization and is written in the storage medium of the cartridge; and
a device which is equipped in each store and refills the expendables in the cartridge.

13. An information processing system using a cartridge which is detachably attached to an electronic device, carries expendables of the electronic device, and has a storage medium in which information that specifies a business organization that provides the electronic device or a business organization associated with that business organization is written by the electronic device when the expendable is consumed by the electronic device, comprising:
a recovery device which is equipped to be used by everyone, and recovers the cartridge with the storage medium in which the information is written; and
a totalization device connected to said recovery device to communicate with each other,
said recovery device comprising acquisition means for acquiring the information from the cartridge, and
said totalization device comprising:
totalization means for receiving the information acquired by said recovery device, and totalizing quantities of expendables consumed for respective business organizations on the basis of the received information.

14. The system according to claim 13, wherein said recovery device comprises:
means for erasing the information that specifies the business organization and is written in the storage medium of the recovered cartridge; and
means for refilling the expendables in the recovered used cartridge.

15. An electronic device which comprises an electronic device main body, and a cartridge detachably attached to said electronic device main body,
said cartridge comprising expendables consumed by said electronic device, and a storage medium for recording information,
said electronic device main body comprising write means for writing information in said storage medium, and
said write means writing at least information that specifies a business organization which provides said electronic device or a business organization associated with that business organization in association with a quantity of expendables consumed by said electronic device.

16. The device according to claim 15, wherein said write means writes at least the information that specifies the business organization which provides said electronic device or the business organization associated with that business organization for each predetermined unit of the expendables.

17. The device according to claim 15, wherein said cartridge carries the expendables to be repetitively refilled.

18. The device according to claim 15, wherein said cartridge comprises a plurality of types of expendables.

19. An electronic device to which a cartridge comprising expendables and a storage medium for storing information is detachably attached, comprising:
write means for writing information in said storage medium, and
said write means writing at least information that specifies a business organization which provides said electronic device or a business organization associated with that business organization in association with a quantity of expendables consumed by said electronic device.

20. The device according to claim 19, wherein said write means writes at least the information that specifies the business organization which provides said electronic device or the business organization associated with that business organization for each predetermined unit of the expendables.

21. A cartridge detachable from an electronic device, comprising:
expendables of said electronic device, and a storage medium for storing information, and
said storage medium being written with information that specifies a business organization for providing said electronic device which consumes the expendables or a business organization associated with that business organization in association with a quantity of expendables consumed by said electronic device.

22. The cartridge according to claim 21, wherein said storage medium has a predetermined storage area in which the information that specifies the business organization in association with the quantity of expendables is written.

* * * * *

UNITED STATES PATENT AND TRADEMARK OFFICE
CERTIFICATE OF CORRECTION

PATENT NO. : 6,577,818 B2
DATED : June 10, 2003
INVENTOR(S) : Hirofumi Hirano

It is certified that error appears in the above-identified patent and that said Letters Patent is hereby corrected as shown below:

Column 6,
Line 45, delete "1c" and insert -- 1c' --.
Line 47, delete "camera [A] 50." and insert -- camera 50. --.

Column 7,
Line 53, delete "camera A." and insert -- camera 50. --.
Line 54, delete "this" and insert -- the --.

Column 8,
Line 12, after "image." insert the following:
-- <Provision Mode of Cartridge and the like>
    A mode that the cartridge and the like are provided to the user will be explained below. --.

Column 17,
Line 63, delete "camera A," and insert -- camera 50, --.

Signed and Sealed this

Sixth Day of January, 2004

JAMES E. ROGAN
*Director of the United States Patent and Trademark Office*